US008953811B1

(12) United States Patent
Sharifi et al.

(10) Patent No.: US 8,953,811 B1
(45) Date of Patent: Feb. 10, 2015

(54) FULL DIGEST OF AN AUDIO FILE FOR IDENTIFYING DUPLICATES

(75) Inventors: Matthew Sharifi, Zurich (CH); Gheorghe Postelnicu, Zurich (CH); Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 256 days.

(21) Appl. No.: 13/450,427

(22) Filed: Apr. 18, 2012

(51) Int. Cl.

| | |
|---|---|
| ***H04R 29/00*** | (2006.01) |
| ***G06F 7/00*** | (2006.01) |
| ***G10L 19/00*** | (2013.01) |
| ***H04H 60/32*** | (2008.01) |

(52) U.S. Cl.
USPC ............... 381/56; 707/10; 704/200.1; 725/18

(58) Field of Classification Search
None
See application file for complete search history.

(56) References Cited

U.S. PATENT DOCUMENTS

| | | | | |
|---|---|---|---|---|
| 2002/0083060 | A1* | 6/2002 | Wang et al. | 707/10 |
| 2005/0044561 | A1* | 2/2005 | McDonald | 725/18 |
| 2009/0157391 | A1* | 6/2009 | Bilobrov | 704/200.1 |

OTHER PUBLICATIONS

Media Hedge, "Digital Fingerprinting," White Paper, Civolution and Gracenote, 2010, http://www.civolution.com/fileadmin/bestanden/white%20papers/Fingerprinting%20-%20by%020Civolution%20and%20Gracenote%20-%202010.pdf, Last accessed Jul. 11, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed Jul. 11, 2012.

* cited by examiner

*Primary Examiner* — Duc Nguyen
*Assistant Examiner* — Yogeshkumar Patel
(74) *Attorney, Agent, or Firm* — Amin, Turocy & Watson, LLP

(57) ABSTRACT

Systems and methods are provided herein relating to audio matching. A compact digest can be generated based on sets of triples, where triples are groupings of three interest points that meet threshold criteria. The compact digest can be used in identifying a potential audio match. A full digest can then be used in verifying the potential match. By using a compact digest to perform audio matching, the audio matching system can be scaled to encompass millions or billions of reference audio samples while still using the full digest to maintain accuracy.

28 Claims, 14 Drawing Sheets

FULL DIGEST OF AN AUDIO FILE FOR IDENTIFYING DUPLICATES

TECHNICAL FIELD

This application relates to audio matching, and more particularly to using both a compact digest and a full digest of an audio file for identifying duplicates.

BACKGROUND

Audio matching provides for identification of a recorded audio sample by comparing the audio sample to a set of reference samples. To make the comparison, an audio sample can be transformed to a time-frequency representation of the sample by using, for example, a short time Fourier transform (STFT). Using the time-frequency representation, interest points that characterize time and frequency locations of peaks or other distinct patterns of the spectrogram can then be extracted from the audio sample. Descriptors can be computed as functions of sets of interest points. Descriptors of the audio sample can then be compared to descriptors of reference samples to determine the identity of the audio sample.

In a typical descriptor audio matching system, the system can match the audio of a probe sample, e.g., a user uploaded audio clip, against a set of references, allowing for a match in any range of the probe sample and a reference sample. In order to match any range of the probe sample with any range of the reference sample, conventional systems generate descriptors of the probe sample based on snapshots of the probe sample at different times, which are looked up in an index of corresponding snapshots from reference samples. When a probe sample has two matching snapshots pairs, they can be combined during matching to time align the probe sample and reference sample. In this type of system, the size of a descriptor grows as the size of the audio sample becomes longer. Storing descriptors associated with hundreds of millions or billions of audio clips becomes difficult to scale with large numbers of descriptors.

In some audio matching systems, the system can be tuned to match the entirety of an audio clip, e.g., finding full duplicates. For example, an audio matching system may be used to discover the identity of full audio tracks in a user's collection of songs against a reference database of known songs. In another example, an audio matching system may be used to discover duplicates within a large data store or collection of audio tracks. Using descriptors capable of matching any range of a probe sample to any range of a reference sample could work for the previous examples; however, using more compact descriptors for the purpose of matching an entire audio track can be more efficient and allow the system to scale to billions of reference samples. Therefore an ability to generate and use more compact descriptors can be beneficial in audio matching.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to audio matching. An input component can receive an audio sample. A spectrogram component can generate a spectrogram of the audio sample based on fast Fourier transforms (FFTs) of overlapping windows and identify a set of local peaks based on the spectrogram. A triples component can generate a set of triples based on the set of local peaks wherein the triples component can further generate an index histogram based on the set of triples. A hash component can generate one or more index hashes based on the index histogram.

This disclosure also provides for a system that includes means for generating a spectrogram of an audio sample based on FFTs of overlapping windows; means for generating a set of local peaks of the spectrogram; means for generating a set of triples based on the set of local peaks; means for generating an index histogram based on the set of triples; and means for transforming the index histogram into one or more index hashes.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
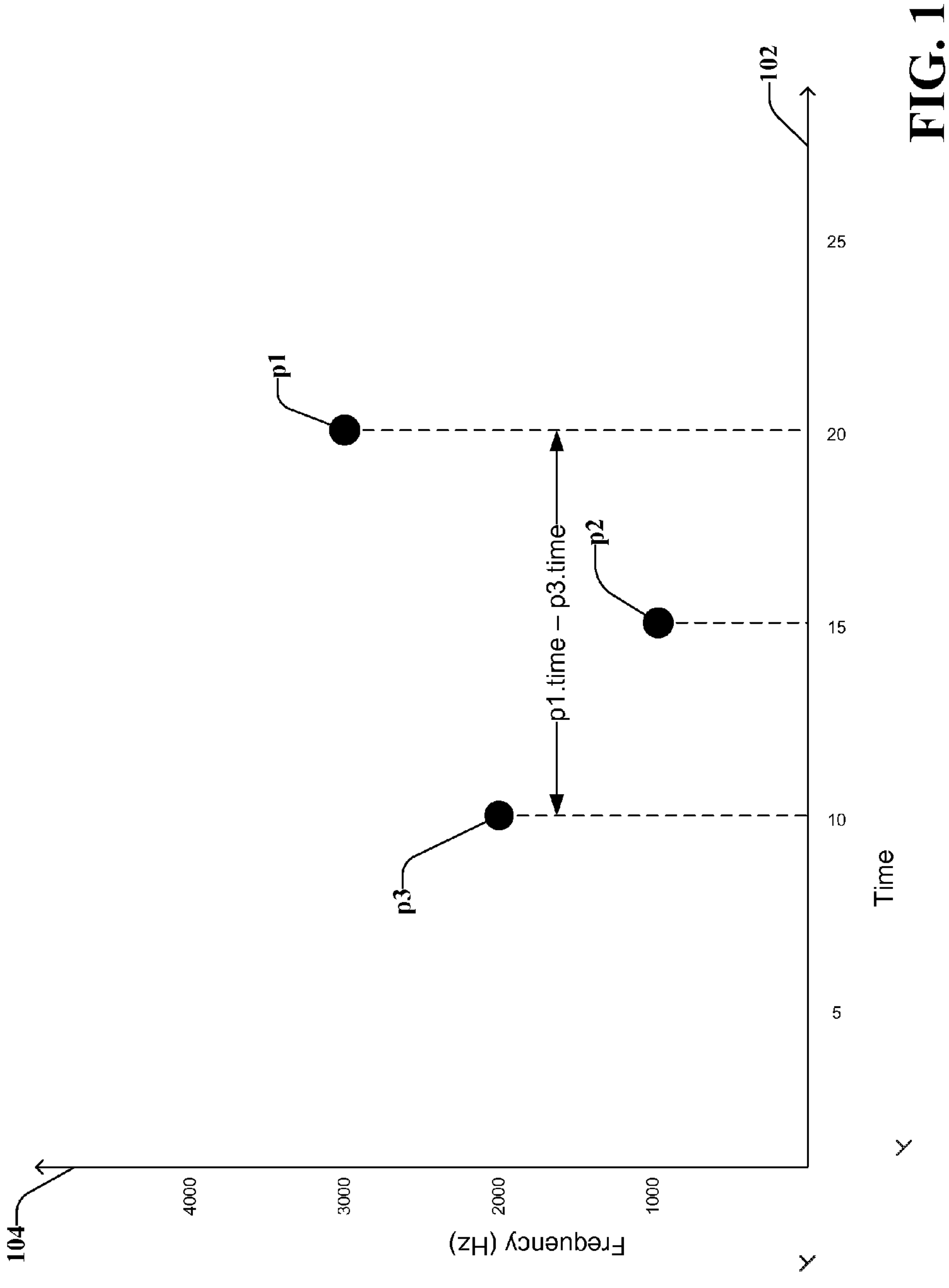
FIG. 1 illustrates an example time frequency plot of a triple in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves analyzing an audio sample for unique characteristics that can be used in comparison to unique characteristics of reference samples to identify the audio sample. One manner to identify unique characteristics of an audio sample is through use of a spectrogram. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at one or more specific frequencies and measure amplitude of the audio sample at that specific frequency over time. The audio sample can be run through additional filters to individually isolate a set of frequencies to measure the amplitude of the set over time. A spectrogram can be created by combining all the measurements over time on the frequency axis to generate a spectrogram image of frequency amplitudes over time.

A second technique involves using short-time Fourier transform ("STFT") to break down an audio sample into time windows, where each window is Fourier transformed to calculate a magnitude of the frequency spectrum for the duration of each window. Combining a plurality of windows side by side on the time axis of the spectrogram creates an image of frequency amplitudes over time. Other techniques, such as wavelet transforms, can also be used to construct a spectrogram.

Creating and storing in a database an entire spectrogram for a plurality of reference samples can use large amounts of storage space and affect scalability of an audio matching system. Therefore, it can be desirable to instead calculate and store compact descriptors of reference samples versus an entire spectrogram. One method of calculating descriptors is to first determine individual interest points that identify unique characteristics of local features of the time-frequency representation of the reference sample. Descriptors can then be computed as functions of sets of interest points.

Calculating interest points involves identifying unique characteristics of the spectrogram. For example, an interest point could be a spectral peak of a specific frequency over a specific window of time. As another non-limiting example, an interest point could also include timing of the onset of a note. It is to be appreciated that conceivably any suitable spectral event over a specific duration of time could constitute an interest point.

In a typical descriptor audio matching system, the system can match the audio of a probe sample, e.g., a user uploaded audio clip, against a set of references, allowing for a match in any range of the probe sample and a reference sample. In order to match any range of the probe sample with any range of the reference sample, descriptors of the probe sample must be generated based on snapshots of the probe sample at different times, which are looked up in an index of corresponding snapshots from reference samples. When a probe sample has multiple matching snapshots pairs, they can be combined during matching to time align the probe sample and reference sample. In this type of system, the size of a descriptor grows as the size of the audio sample becomes longer. For example, the size of a descriptor for a five minute audio clip could approach a size between one hundred and three hundred kilobytes. Storing descriptors associated with hundreds of millions or billions of audio clips can become difficult to scale with large descriptors.

In some audio matching systems, the system can be tuned to match the entirety of an audio clip, e.g., finding full duplicates. For example, an audio matching system may be used to discover the identity of full audio tracks in a user's collection of songs against a reference database of known songs. Such a system could be useful for any cloud music service to allow a user to match their collection against a set of known recordings. In another example, an audio matching system may be used to discover duplicates within a large data store or collection of audio tracks. In yet another example, an audio matching system can be used for clustering together multiple user recordings. Using descriptors capable of matching any range of a probe sample to any range of a reference sample, as described in the paragraph above, could work for the previous examples; however, using more compact descriptors for the purpose of matching an entire audio track can be more efficient and allow the system to scale to billions of reference samples.

Systems and methods herein provide for generating and using two parts of an audio digest. The first part, an index hash, is a compact digest used for retrieval of potential matches and is optimized to be both compact and efficient for matching at large scales. The second part, a verification hash, is a full digest used for verification of a match to the index hash and does not need to be indexed. A spectrogram component can generate a spectrogram of the audio sample based on fast Fourier transforms (FFTs) of overlapping windows and identify a set of local peaks based on the spectrogram. A triples component can generate a set of triples based on the set of local peaks wherein the triples component can further generate an index histogram based on the set of triples. A hash component can generate one or more index hashes based on the index histogram. A verification component can generate a verification histogram based on the set of local peaks and transform the verification histogram into one or more verification hashes. In one implementation, an index component can add the one or more index hashes to a set of index hashes stored within an index data store and add the one or more verification hashes to a set of verification hashes stored within a verification data store; wherein the one or more index hashes and the one or more verification hashes are associated with each other. In another implementation, a matching component can compare the one or more index hashes to a set of index hashes to determine a potential match wherein the matching component can verify the potential match by comparing the one or more verification hashes to a set of verification hashes associated with the potential match.

Referring to FIG. 1, there is illustrated an example time frequency plot of a triple in accordance with implementations of this disclosure. As stated above, an index hash can be generated and used for retrieval of potential matches. By using triples as a basis for the index hash, the index hash can be more efficient for matching at large scales, e.g., due to the unique nature of triples. Triples can be generated by first generating a spectrogram of an audio sample, using, for example, fast Fourier transforms (FFTs) of overlapping windows. Using the spectrogram, a set of local time, frequency peaks, also known as interest points, can be identified. FIG. 1 depicts time on a horizontal axis 102 and frequency on a vertical axis 104. Three interest points are plotted in FIG. 1: p1, p2, and p3. Each interest point can be associated with both a time and frequency of the interest point, e.g., p1.time, p1.frequency, p2.time, p2.frequency, p3.time, and p.3 frequency. Identified triples can be filtered for meeting at least two distinct thresholds. The first threshold can be that p1.time>p2.time>p.3 time. This will provide for p1 to be the latest occurring interest point and p3 to be the earliest occurring interest point in each triple. The second threshold can be the establishment of a maximum time span for a triple. The time span for each triple can be defined as p1.time minus p3.time. An example maximum time span can be 15 time units. It can be appreciated that a time unit could be seconds, milliseconds, microseconds, etc. In the depicted example, p1.time equals 20 time units and p3.time equals 10 time units. Thus, the time span of the triple {p1, p2, p3} is 20−10 or 10 time units. As the maximum time span in this example is 15 time units, the triple depicted in FIG. 1 would not exceed the maximum time span and therefore would be an identified triple. All combinations of triples that meet the first and second thresholds can be identified and included in a set of triples.

Each identified triple can then be entered into a sparse histogram. The triple can be described by identifying the following features of each triple: p1.frequency, p2.frequency, p3.frequency, p1.time, p1.time-p3.time. These features can map to a bin in the histogram which can then be turned into a hash. The set of features encodes the frequency bands of the three peaks along with a quantized time at which the latest point occurs, and the time span of the triple. Using the triple as depicted in FIG. 1, the triple can be identified by the set of features {3000, 1000, 2000, 20, 10}. The histogram can then be turned into a hash suitable for indexing using, for example, a weighted minhash. For example, a number of 64 bit weighted min hashes can be generated. In this example, 32 64 bit minhashes would give a 256 byte storage requirement for a descriptor based on the 32 64 bit weighted minhashes. Using such a compact hash allows for storage of over four million clips in 1 GB, or over four billion clips in 1 TB. Weighted minhashes can be used as described in "Improved Consistent Sampling, Weighted Minhash and L1 Sketching" by Sergey Ioffe, ICDM, 2010. This is a similarity hash which approximates the Jaccard similarity between two histograms.

In an alternate embodiment, triples can be generated that are resistant to pitch shifting and/or time stretching. For example, using frequency ratios instead of quantized absolute frequencies can be more resistant to pitch shifting. A triple generated based on frequency ratios can replace the frequency based features of the triple with ratios. For example, a triple based on frequency ratios can be encoded using the following features: p1.frequency/p2.frequency, p2.frequency/p3.frequency, p1.time, p1.time-p3.time. Similarly, the time span portion of the triple features can be replaced with a time ratio to be more resistant to time stretching distortions. The exact time of p1, or the latest occurring point of the triple can be replaced with time bin information. For example, the audio clip can be divided into N (N is an integer) equal sized time bins and the bin in which p1 falls can be identified rather than p1.time. For example, a triple based on time ratios can encoded using the following features: p1.frequency, p2.frequency, p3.frequency, p1.time, (p1.time-p2.time)/(p2.time-p3.time). It can be appreciated that frequency ratios and time ratios can be combined in an alternate embodiment to generate triples that are resistant to both pitch shifting and time stretching.

A verification hash can be generated based on generating a histogram that contains each original interest point independently, based on the interest point's time and frequency components, e.g., p1.frequency, p1.time. The verification hash can also be, for example, a weighted minhash. The verification hash can be stored and used for verification of a potential match and thus does not affect the size of the index hash.

Figure 2:
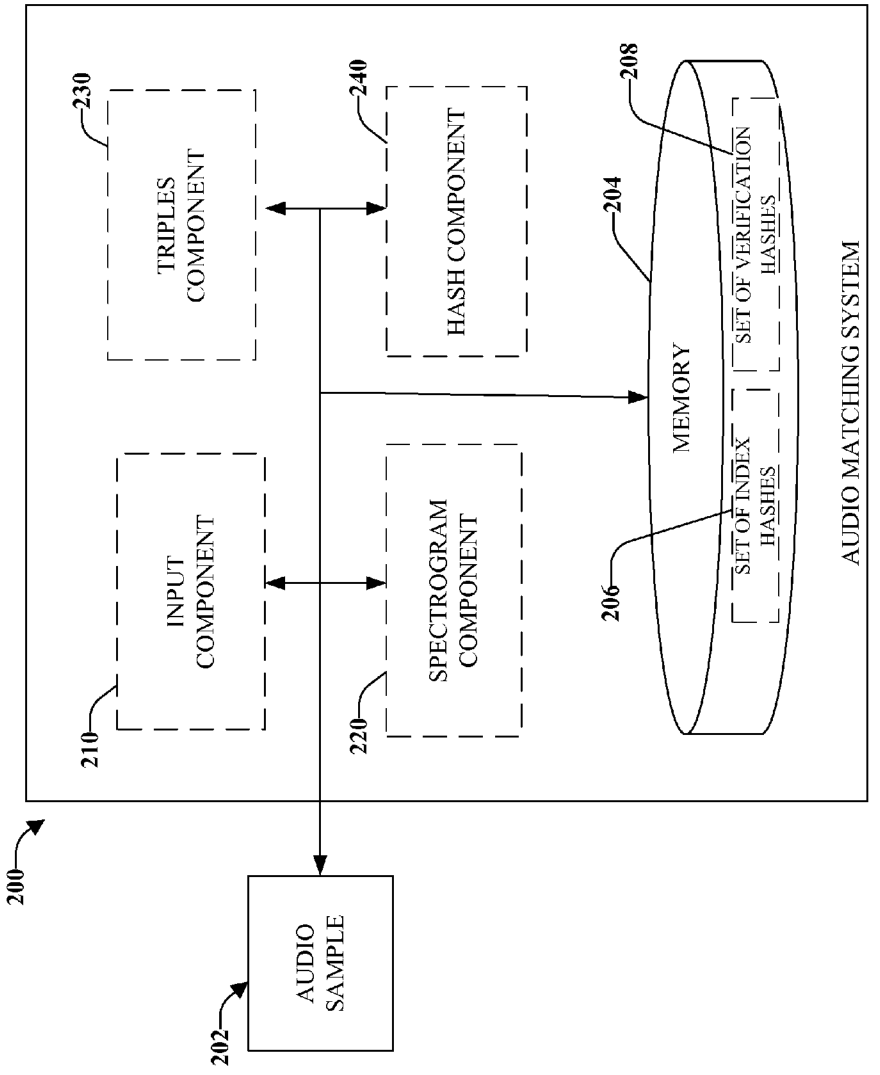
FIG. 2 illustrates a high-level functional block diagram of an example audio matching system using triples to generate index hashes in accordance with implementations of this disclosure.

Referring now to FIG. 2, there is illustrated a high-level functional block diagram of an example audio matching system using triples to generate index hashes in accordance with implementations of this disclosure. In FIG. 2, an audio matching system 200 includes an input component 210, a spectrogram component 220, a triples component 230, a hash component 240, and a memory 204, each of which may be coupled as illustrated. An input component 210 can receive an audio sample 202. A spectrogram component 220 can generate a spectrogram of the audio sample 202 based on fast Fourier transforms (FFTs) of overlapping windows and identify a set of local peaks based on the spectrogram. In one implementation, each local peak in the set of local peaks are maxima in a local time/frequency window.

A triples component 230 can generate a set of triples based on the set of local peaks wherein the triples component can further generate an index histogram based on the set of triples. In one implementation, triples component 230 can generate the set of triples further based on a maximum time span for each triple. Each triple in the set of triples can contain a first frequency maxima, a second frequency maxima, a third frequency maxima, a quantized time of a latest maxima, and a time span. A hash component 240 can generate one or more index hashes based on the index histogram. In one implementation, the one or more index hashes can be weighted minhashes.

Figure 3:
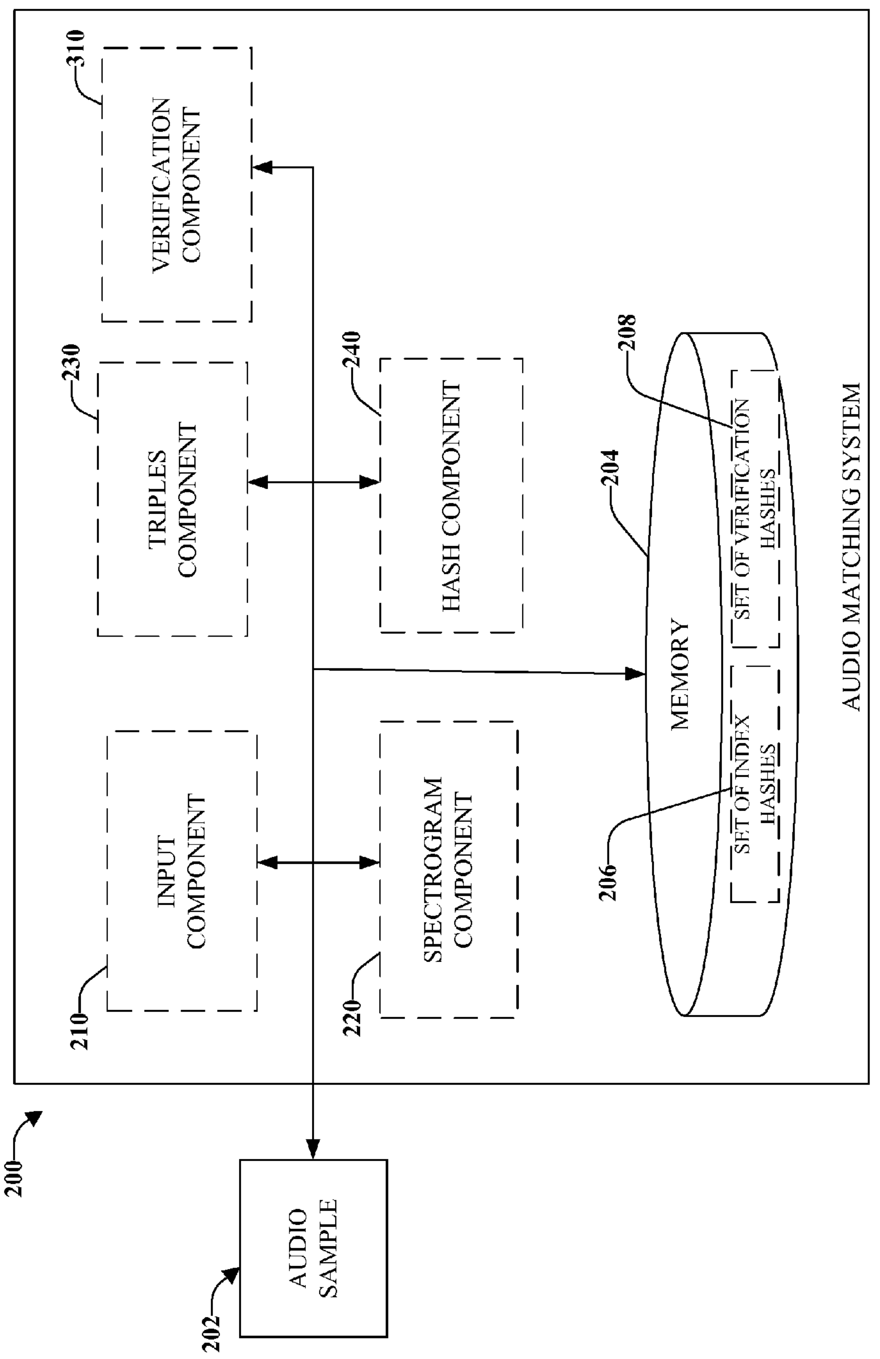
FIG. 3 illustrates a high-level functional block diagram of an example audio matching system using triples to generate index hashes including a verification component in accordance with implementations of this disclosure

Referring now to FIG. 3, there is illustrated a high-level functional block diagram of an example audio matching system using triples to generate index hashes including a verification component 310 in accordance with implementations of this disclosure. Verification component 310 can generate a verification histogram based on the set of local peaks (e.g., by taking the original interest points independently and computing a histogram of their time and frequency components) and transform the verification histogram into one or more verification hashes. In one implementation, the one or more verification hashes can be weighted minhashes. Verification hashes can be stored and used for verification. Verification hashes do not impact the index size so typically this part of the fingerprint, the second part of the fingerprint, will be bigger than the first part, e.g., about the size of 128 index hashes.

In an alternate implementation, the verification portion of the fingerprint can be computed by pairing up interest points and using a single frequency ratio and time component for each pair.

Figure 4:
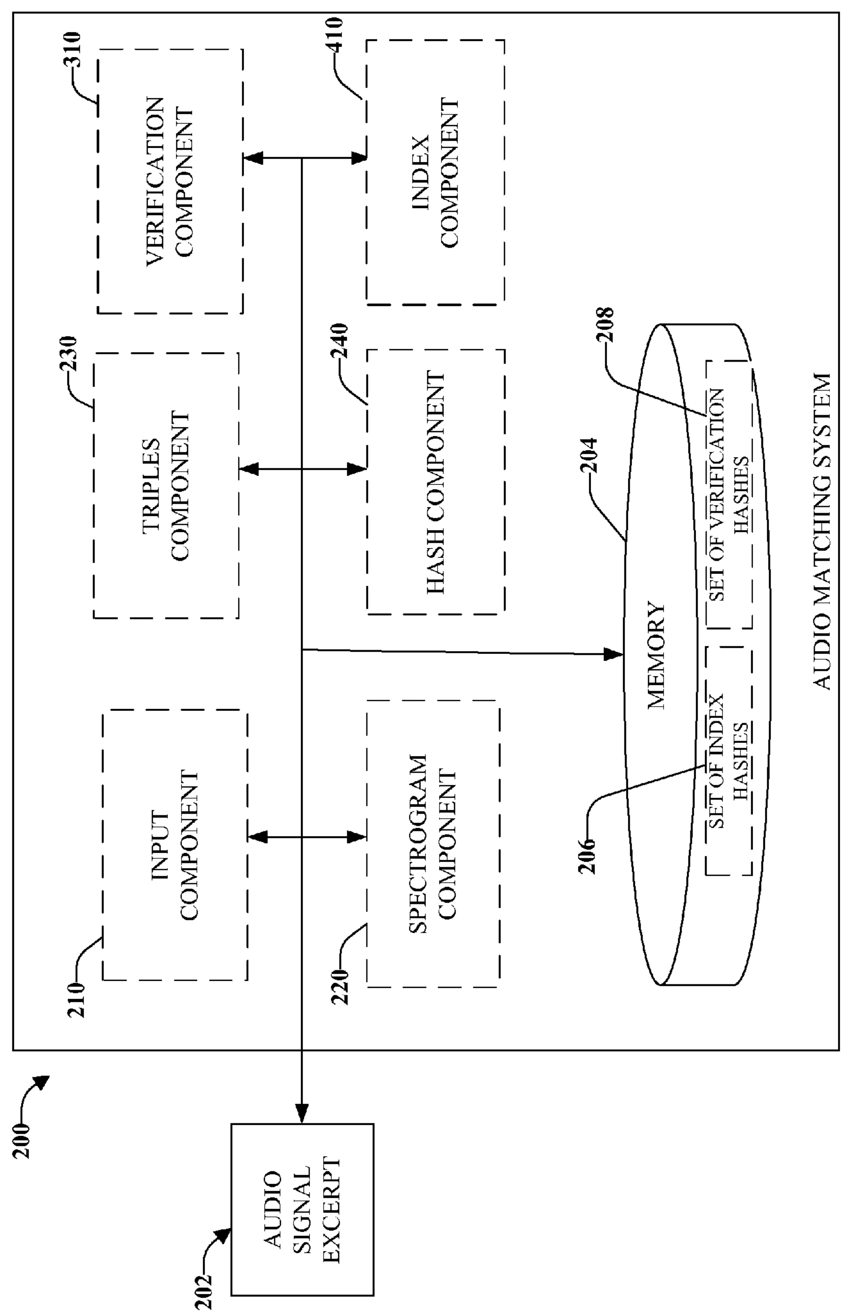
FIG. 4 illustrates a high-level functional block diagram of an example audio matching system using triples to generate index hashes including an index component in accordance with implementations of this disclosure.

Referring now to FIG. 4, there is illustrated a high-level functional block diagram of an example audio matching system using triples to generate index hashes including an index component 410 in accordance with implementations of this disclosure. Index component 410 can add the one or more index hashes to a set of index hashes 206 stored within an index data store (e.g., memory 204) and add the one or more verification hashes to a set of verification hashes 208 stored within a verification data store (e.g., memory 204) wherein the one or more index hashes and the one or more verification hashes are associated. It can be appreciated that the index data store and verification data store can be in disparate locations and can be hosted from or located in a disparate location than audio matching system 200. By associating the one or more index hashes with the one or more verification hashes, the index hash can be used, for example as more fully described in regards to FIG. 5, to generate a potential match and the associated verification hash can be used to verify the match.

Figure 5:
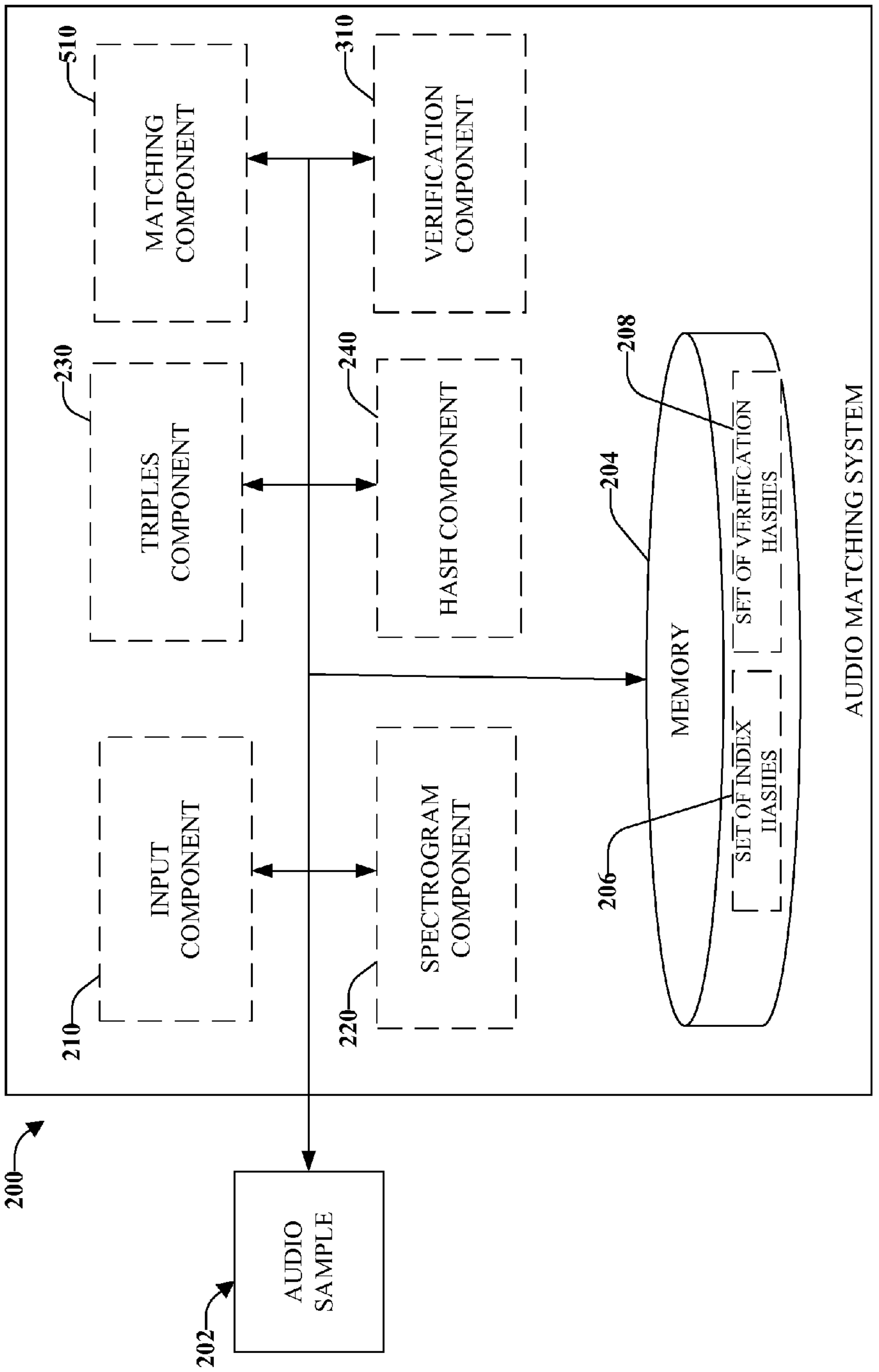
FIG. 5 illustrates a high-level functional block diagram of an example audio matching system using triples to generate index hashes including a matching component in accordance with implementations of this disclosure.

Referring now to FIG. 5, there is illustrated a high-level functional block diagram of an example audio matching system using triples to generate index hashes including a matching component 510 in accordance with implementations of this disclosure. Matching component 510 can compare the one or more index hashes generated by hash component 240, to a set of index hashes 206 to determine a potential match. In another implementation, matching component 510 can use a hamming similarity in comparing the one or more index hashes to a set of index hashes 206 to determine a potential match. In another implementation, matching component 510 can use the set of index hashes 206 to identify a set of potential matches. Matching component 510 can verify the potential match or one potential match among a set of potential matches by comparing the one or more verification hashes generated by verification component 310 and associated with the potential match to a set of verification hashes 208 associated with the potential match.

Figure 6:
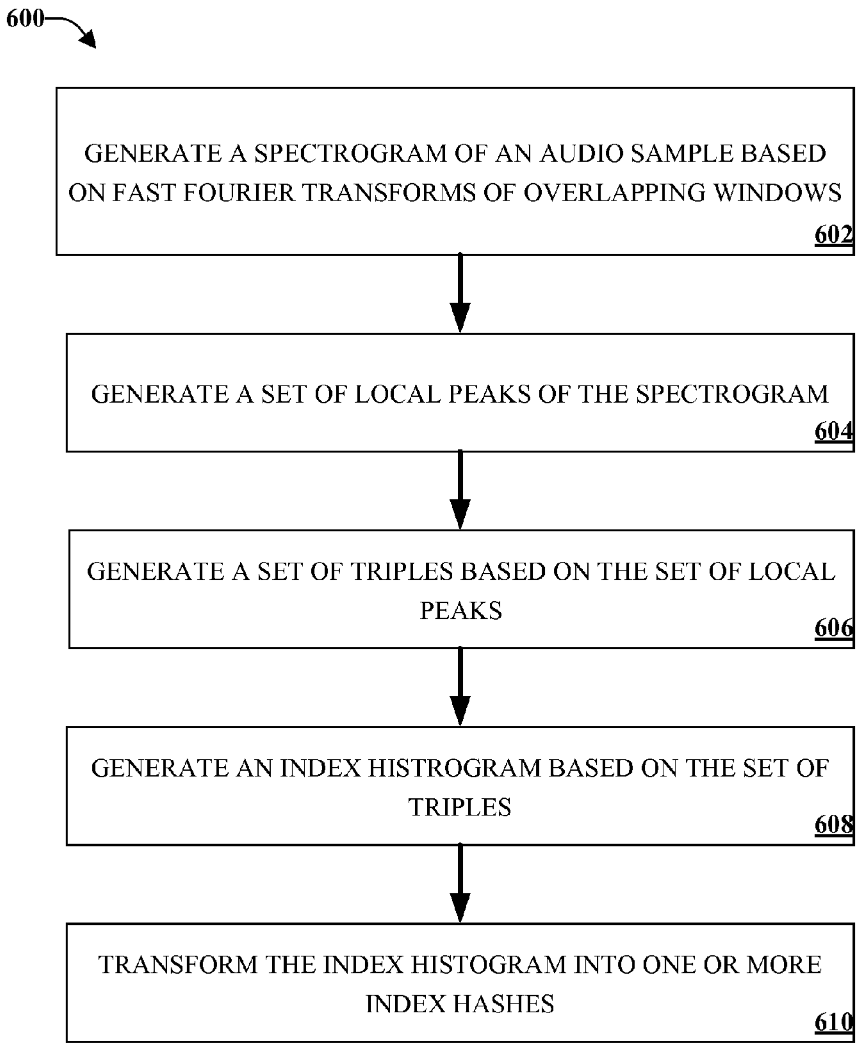
FIG. 6 illustrates an example method for using triples to generate index hashes in accordance with implementations of this disclosure.
Figure 7:
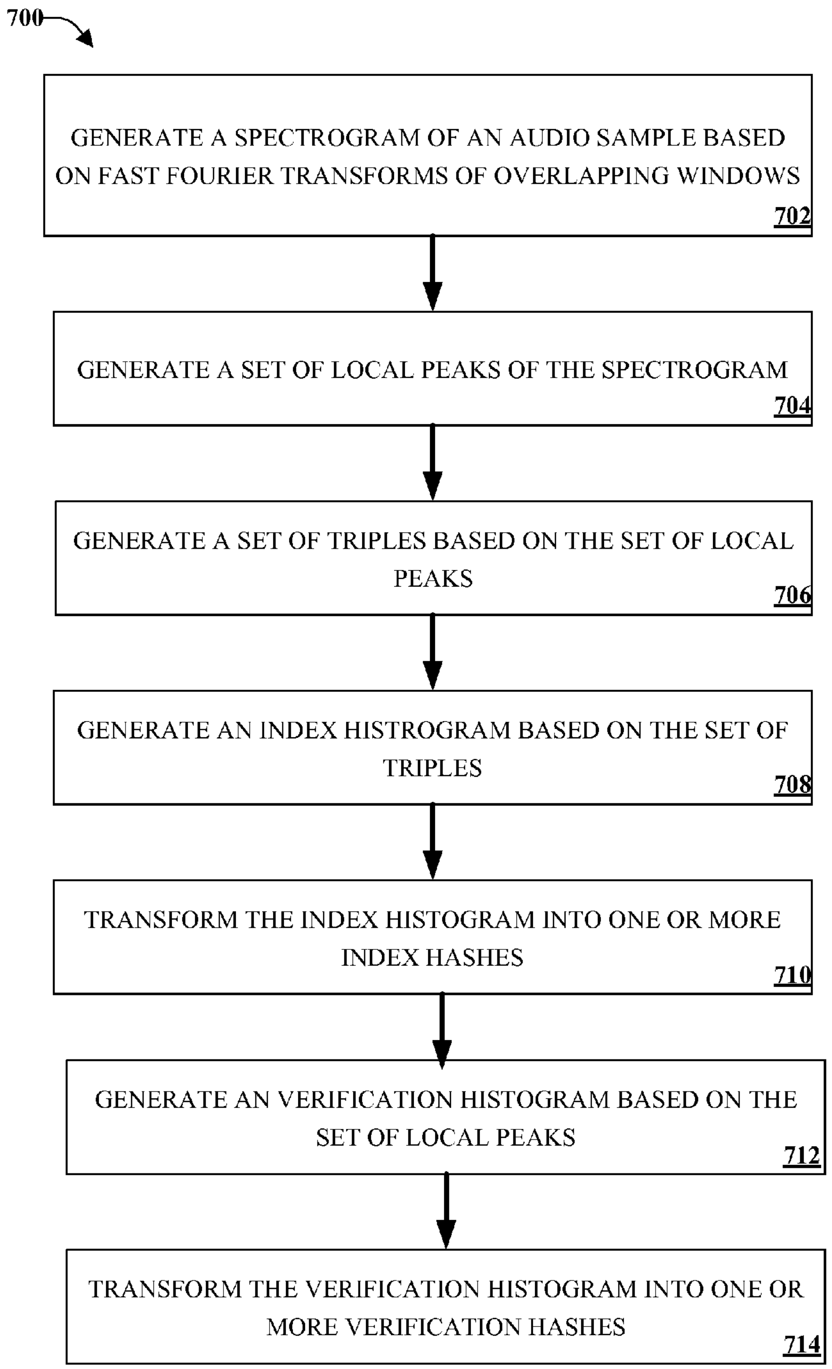
FIG. 7 illustrates an example method for using triples to generate index hashes and generating verification hashes in accordance with implementations of this disclosure.
Figure 8:
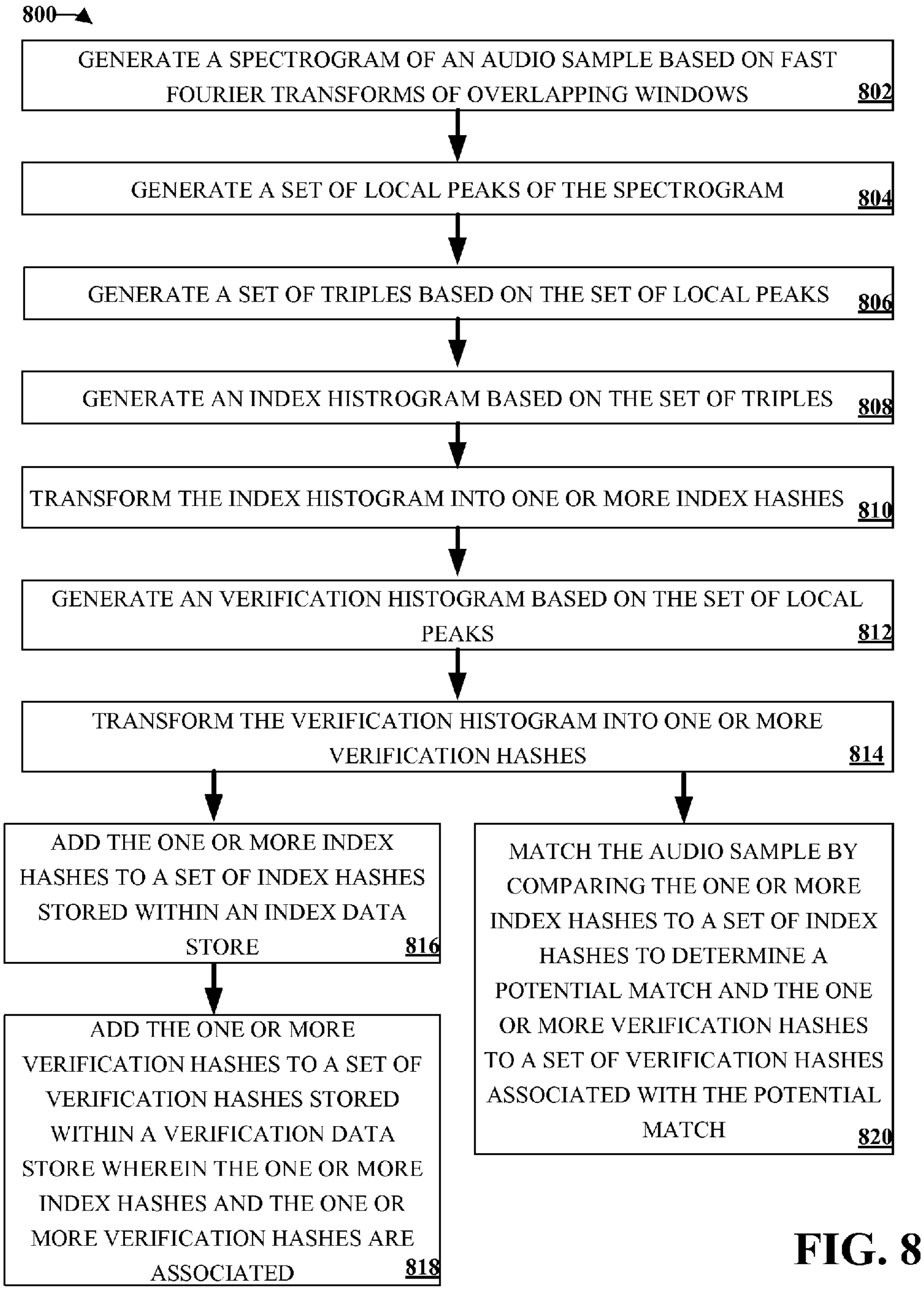
FIG. 8 illustrates an example method for using index hashes and verification hashes in building a reference sets or in matching an audio signal in accordance with implementations of this disclosure.

FIGS. 6-8 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methods.

FIG. 6 illustrates an example method for using triples to generate index hashes in accordance with implementations of this disclosure. At 602, a spectrogram can be generated (e.g., by a spectrogram component 220) for an audio sample based on fast Fourier transforms (FFTs) of overlapping windows. At 604, a set of local peaks of the spectrogram can be generated (e.g., by a spectrogram component). In one implementation, local peaks in the set of local peaks are maxima in a local time/frequency window. At 606, a set of triples can be generated (e.g., by a triples component 230) based on the set of local peaks. In one implementation, generating the set of triples is further based on a maximum time span for each triple. In one implementation, each triple in the set of triples contains a first frequency maxima, a second frequency maxima, a third frequency maxima, a quantized time of a latest maxima, and a time span. At 608, an index histogram can be generated (e.g., by a triples component 230) based on the set of triples. At 610, the index histogram can be transformed (e.g., by a hash component 240) into one or more index hashes. In one implementation, the one or more index hashes can be weighted minhashes.

FIG. 7 illustrates an example method for using triples to generate index hashes and generating verification hashes in accordance with implementations of this disclosure. At 702, a spectrogram can be generated (e.g., by a spectrogram component) for an audio sample based on fast Fourier transforms (FFTs) of overlapping windows. At 704, a set of local peaks of the spectrogram can be generated (e.g., by a spectrogram component). In one implementation, local peaks in the set of local peaks are maxima in a local time/frequency window. At 706, a set of triples can be generated (e.g., by a triples component) based on the set of local peaks. In one implementation, generating the set of triples is further based on a maximum time span for each triple. In one implementation, each triple in the set of triples contains a first frequency maxima, a second frequency maxima, a third frequency maxima, a quantized time of a latest maxima, and a time span. At 708, an index histogram can be generated (e.g., by a triples component) based on the set of triples. At 710, the index histogram can be transformed (e.g., by a hash component) into one or more index hashes. In one implementation, the one or more index hashes can be weighted minhashes. At 712, a verification histogram can be generated (e.g., by a verification component 310) based on the set of local peaks. At 714, the verification histogram can be transformed (e.g., by a verification component) into one or more verification hashes. In one implementation, the one or more verification hashes can be weighted minhashes.

FIG. 8 illustrates an example method for using index hashes and verification hashes in building a reference sets or in matching an audio signal in accordance with implementations of this disclosure. At 802, a spectrogram can be generated (e.g., by a spectrogram component) for an audio sample based on fast Fourier transforms (FFTs) of overlapping windows. At 804, a set of local peaks of the spectrogram can be generated (e.g., by a spectrogram component). In one implementation, local peaks in the set of local peaks are maxima in a local time/frequency window. At 806, a set of triples can be generated (e.g., by a triples component) based on the set of local peaks. In one implementation, generating the set of triples is further based on a maximum time span for each triple. In one implementation, each triple in the set of triples contains a first frequency maxima, a second frequency maxima, a third frequency maxima, a quantized time of a latest maxima, and a time span. At 808, an index histogram can be generated (e.g., by a triples component) based on the set of triples. At 810, the index histogram can be transformed (e.g., by a hash component) into one or more index hashes. In one implementation, the one or more index hashes can be weighted minhashes. At 812, a verification histogram can be generated (e.g., by a verification component) based on the set of local peaks. At 814, the verification histogram can be transformed (e.g., by a verification component) into one or more verification hashes. In one implementation, the one or more verification hashes can be weighted minhashes.

At 816, the one or more index hashes can be added (e.g., by an index component 410) to a set of index hashes stored within an index data store. At 818, the one or more verification hashes can be added (e.g., by an index component) to a set of verification hashes stored within a verification data store wherein the one or more index hashes and the one or more verification hashes are associated.

Alternative to acts 816-818, at 820, the audio sample can be matched (e.g., by a matching component 510) by comparing the one or more index hashes transformed at 810 to a set of index hashes to determine a potential match and the one or more verification hashes to a set of verification hashes associated with the potential match.

Figure 9:
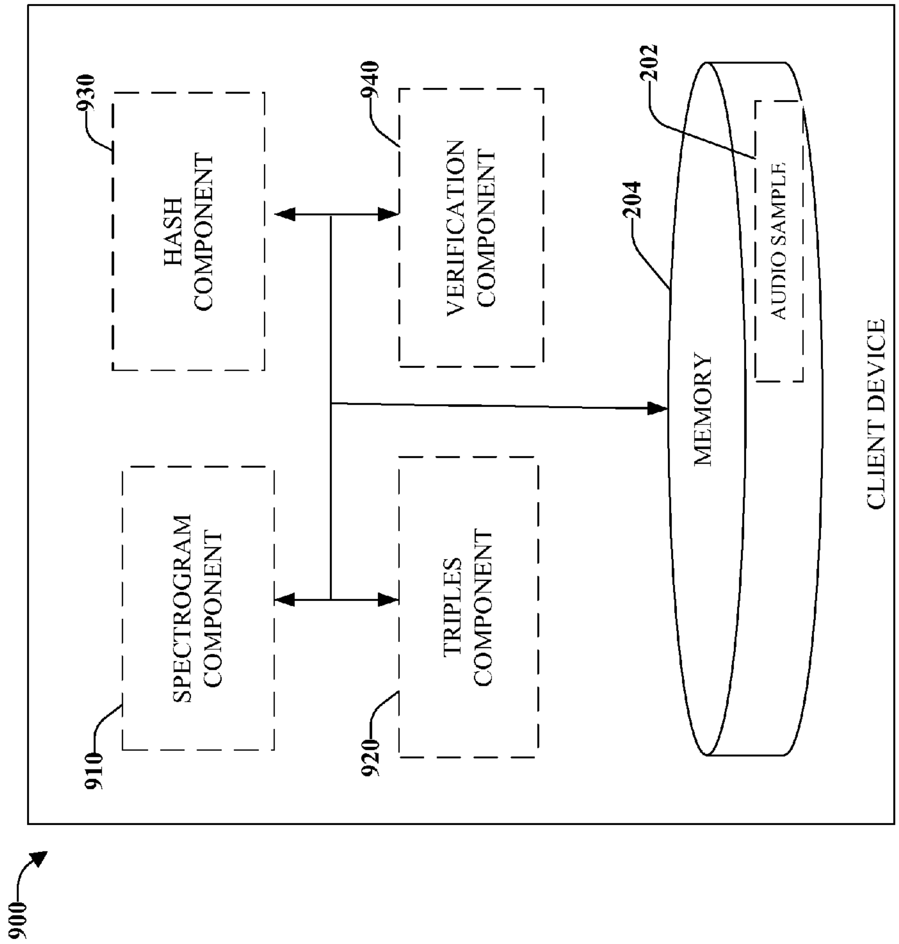
FIG. 9 illustrates a high-level functional block diagram of an example client device using triples to generate index hashes in accordance with implementations of this disclosure.

FIG. 9 illustrates a high-level functional block diagram of an example client device using triples to generate index hashes in accordance with implementations of this disclosure. A client device could include a smart phone, a tablet, an e-reader, a personal digital assistant, a desktop computer, a laptop computer, a server, etc. A spectrogram component 910 can generate a spectrogram of an audio sample 202 based on fast Fourier transforms (FFTs) of overlapping windows and identify a set of local peaks based on the spectrogram. Audio sample 202 can be an audio file stored within memory 204. A triples component 920 can generate a set of triples based on the set of local peaks. The triples component 920 can further generate an index histogram based on the set of triples. A hash component 930 can generate one or more index hashes based on the index histogram. A verification component 940 can generate a verification histogram based on the set of local peaks and transforms the verification histogram into one or more verification hashes.

Figure 10:
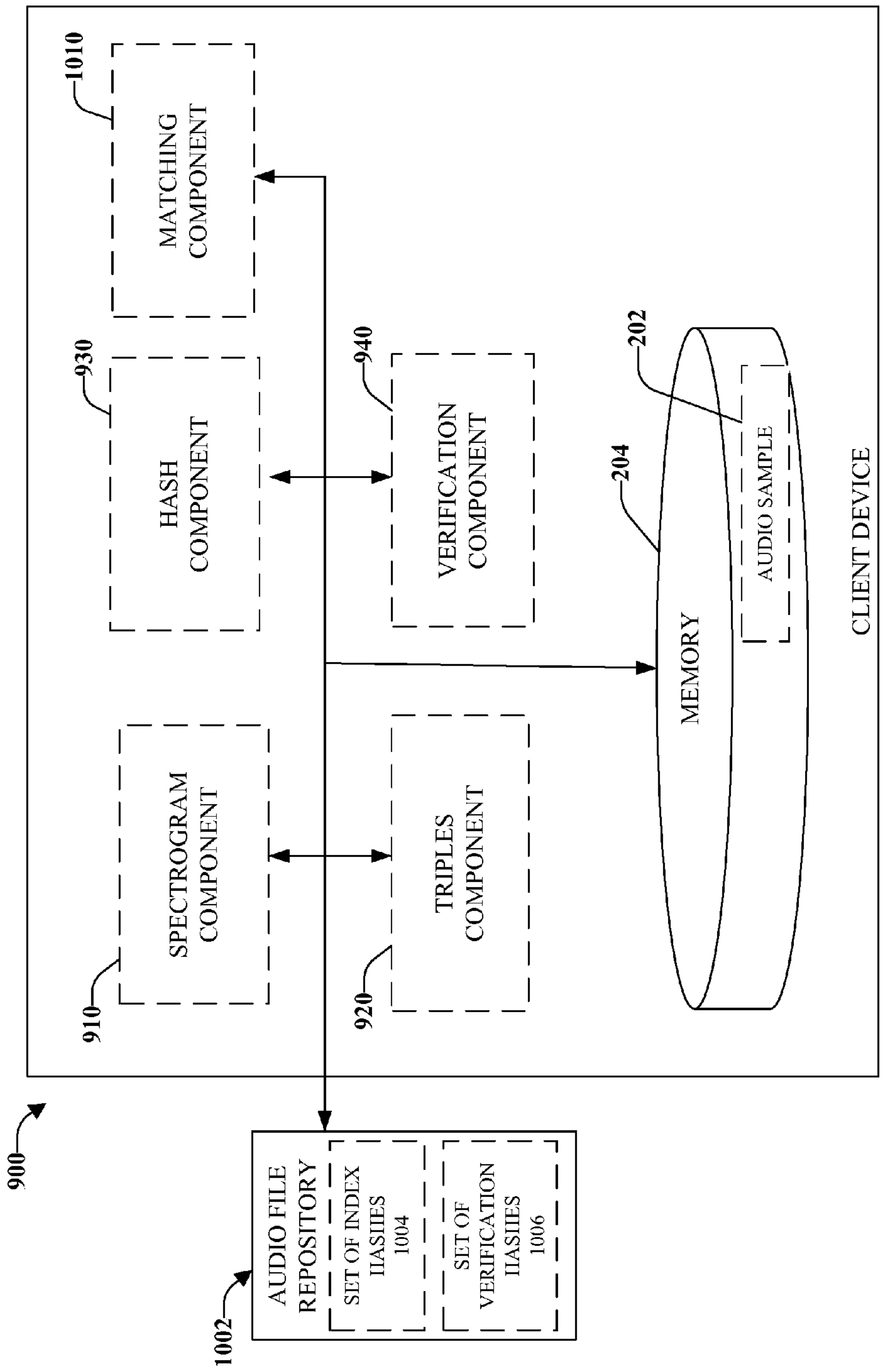
FIG. 10 illustrates a high-level functional block diagram of an example client device using triples to generate index hashes including a matching component in accordance with implementations of this disclosure.

FIG. 10 illustrates a high-level functional block diagram of an example client device using triples to generate index hashes including a matching component 1010 in accordance with implementations of this disclosure. Matching component 1010 can employ the one or more index hashes generated by hash component 930 to identify a potential match of the audio sample and an audio file stored in a repository 1002. In one implementation, matching component 1010 can further employ the one or more verification hashes to verify the match. Audio file repository 1002 can contain a set of index hashes 1004 and a set of verification hashes 1006 which matching component 1010 can utilize in identifying a potential match or verifying a potential match.

Figure 11:
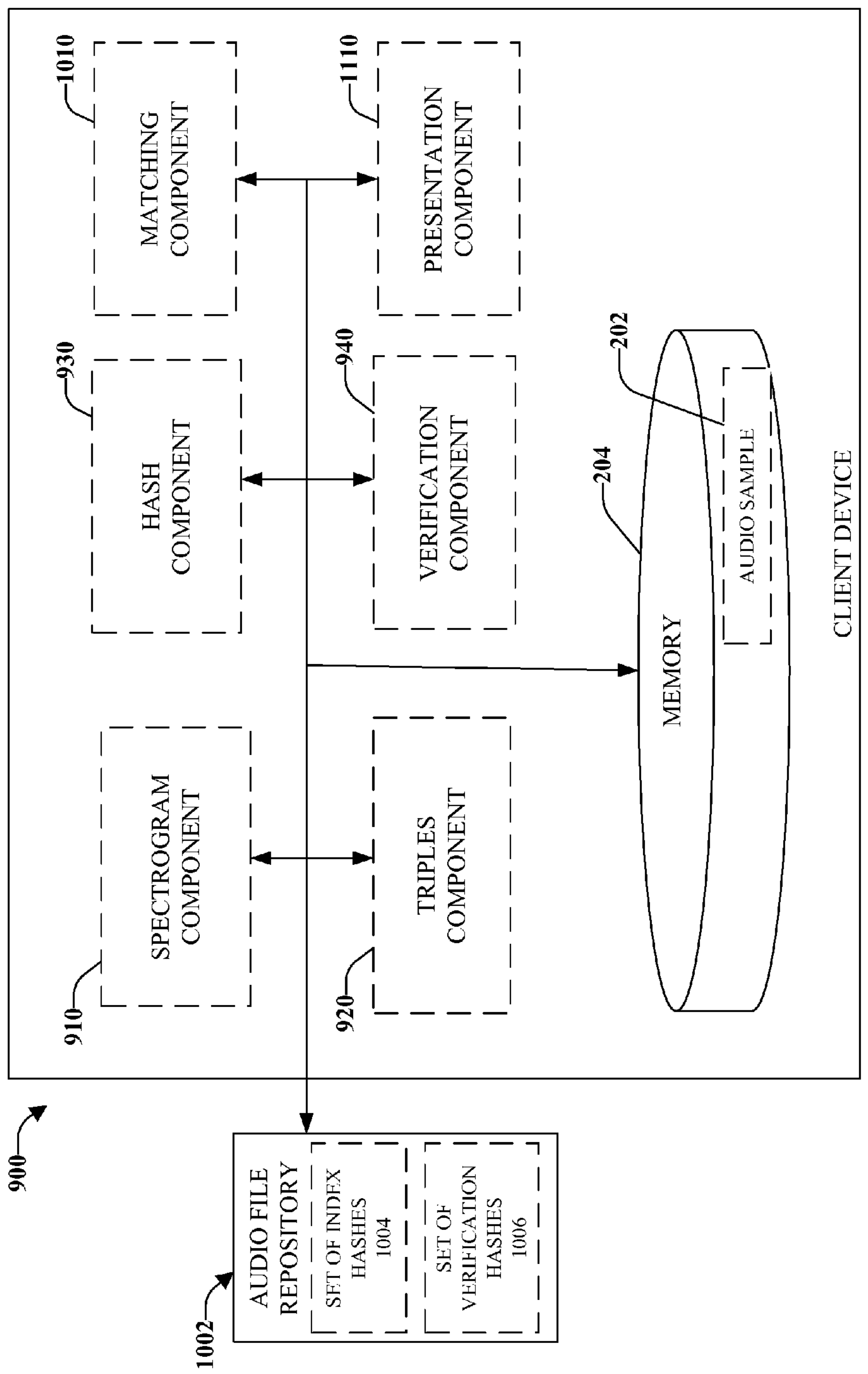
FIG. 11 illustrates a high-level functional block diagram of an example client device using triples to generate index hashes including a presentation component in accordance with implementations of this disclosure.

FIG. 11 illustrates a high-level functional block diagram of an example client device using triples to generate index hashes including a presentation component 1110 in accordance with implementations of this disclosure. Presentation component 1110 can display identification of the matched audio file on client device 900. For example, presentation component 1110 can display metadata associated with the matched filed on the client device, wherein the metadata can include an artist, an album, a year, a genre, etc. associated with the matched audio file. Presentation component can identify that the displayed metadata is associated with the audio sample, by, for example, displaying the name and/or storage location within 204 of the audio sample.

Figure 12:
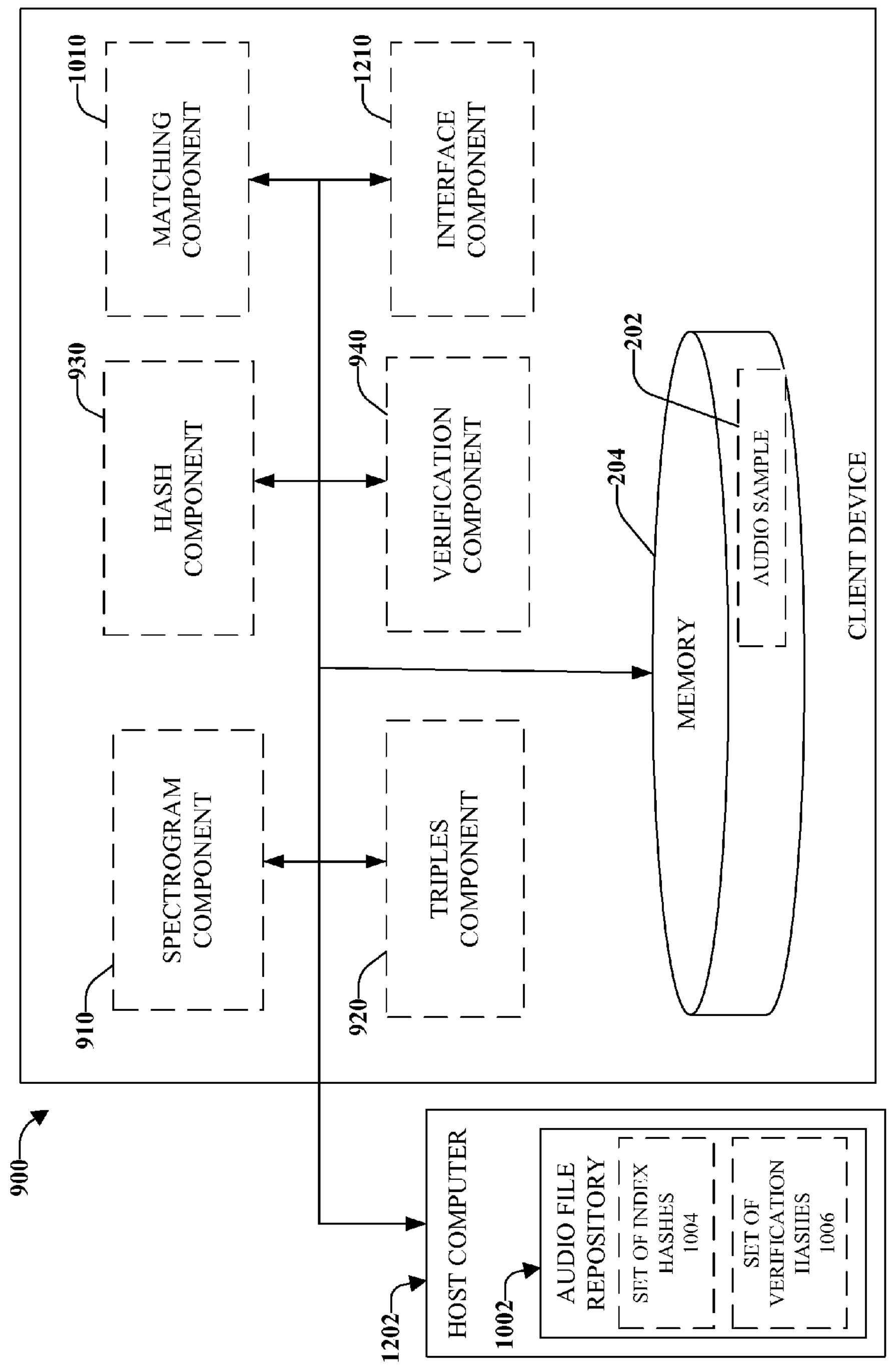
FIG. 12 illustrates a high-level functional block diagram of an example client device using triples to generate index hashes including an interface component in accordance with implementations of this disclosure.

FIG. 12 illustrates a high-level functional block diagram of an example client device using triples to generate index hashes including an interface component 1210 in accordance with implementations of this disclosure. Interface component 1210 can communicatively couple the matching component to the repository of stored audio files 1002, e.g., in implementations where the repository is located in a host computer 1202. In one implementation, matching component 1010 can perform the match by transmitting the one or more index hashes and the one or more verification hashes to the host computer 1202. The host computer 1202 can employ the one or more index hashes to identify a potential match and the one or more verification hashes to verify the potential match. Host computer 1202 can utilize audio file repository 1002 that can contain a set of index hashes 1004 and a set of verification hashes 1006, in identifying a potential match or verifying a potential match.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 13:
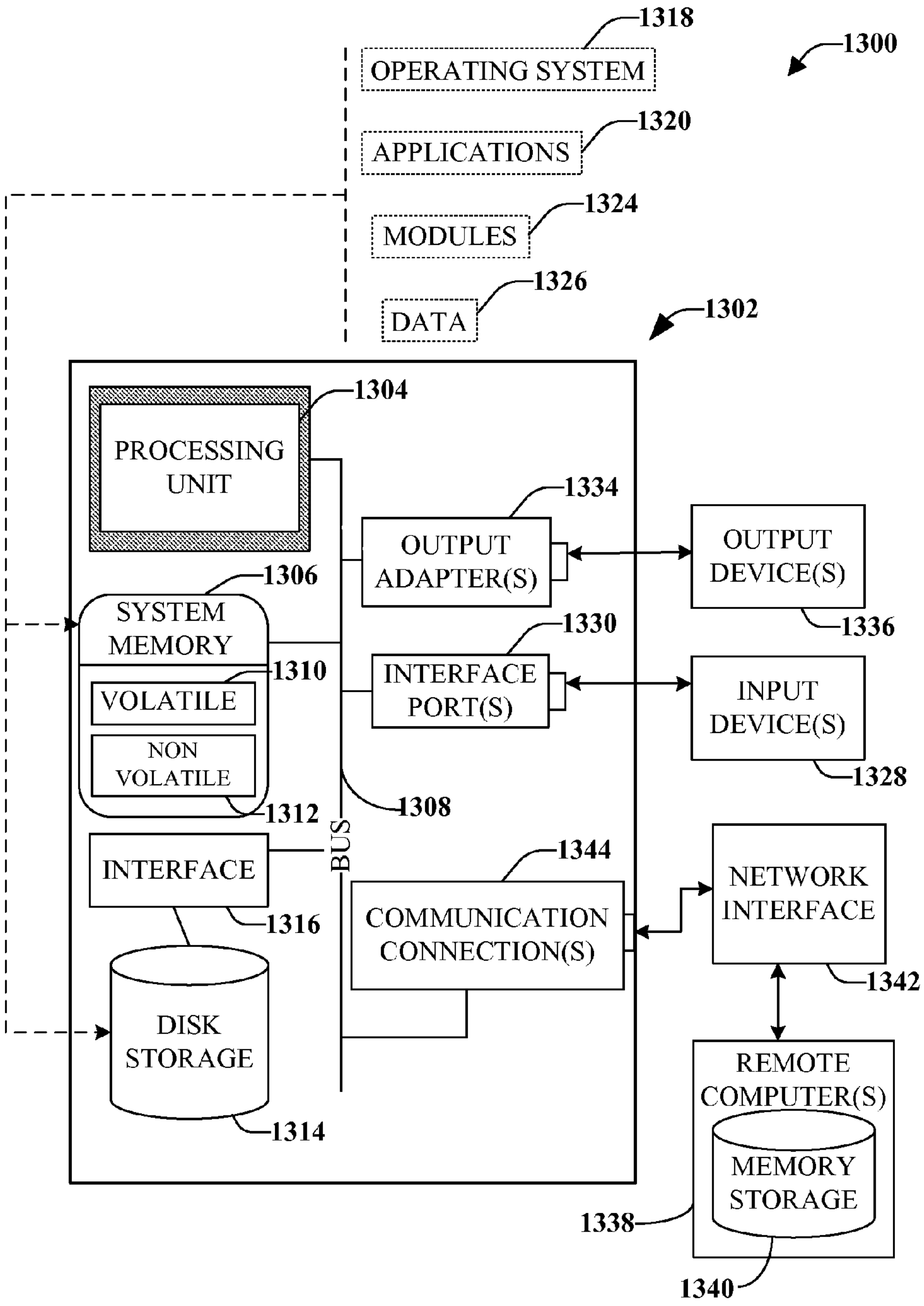
FIG. 13 illustrates an example block diagram of a computer operable to execute the disclosed architecture in accordance with implementations of this disclosure.

With reference to FIG. 13, a suitable environment 1300 for implementing various aspects of the claimed subject matter includes a computer 1302. For example, computer 1302 can be used for implementing systems 200 and 900 respectively. The computer 1302 includes a processing unit 1304, a system memory 1306, and a system bus 1308. The system bus 1308 couples system components including, but not limited to, the system memory 1306 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory. According to present aspects, the volatile memory may store the write operation retry logic (not shown in FIG. 13) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 1302 may also include removable/non-removable, volatile/non-volatile computer storage media. FIG. 13 illustrates, for example, a disk storage 1314. Disk storage 1314 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1314 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316.

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer system 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems. Previously described components, such as input component 210, spectrogram component 220, triples component 230, verification component 310, etc. can be implemented as applications 1320 that utilize modules 1324 or as modules 1324.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s) 1328. Thus, for example, a USB port may be used to provide input to computer 1302, and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
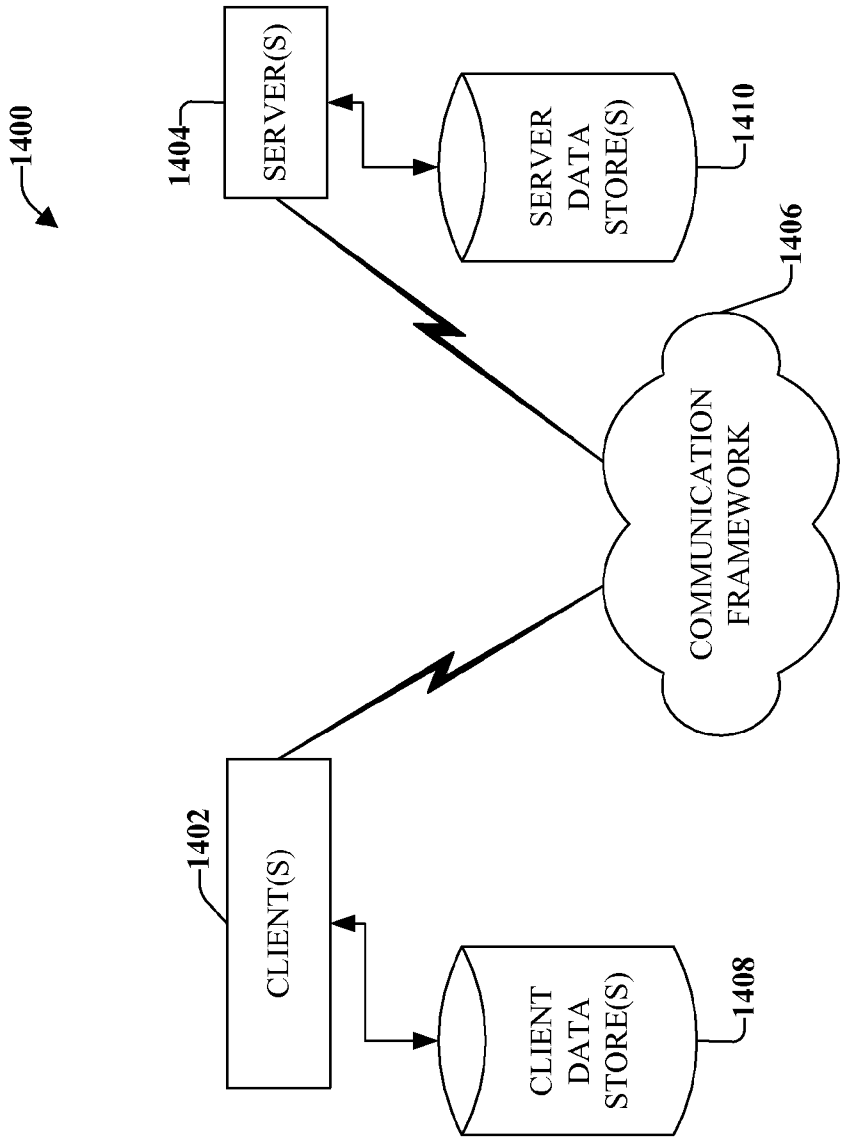
FIG. 14 illustrates an example schematic block diagram for a computing environment in accordance with implementations of this disclosure.

Referring now to FIG. 14, there is illustrated a schematic block diagram of a computing environment 1400 in accordance with the subject specification. The system 1400 includes one or more client(s) 1402, which can include an application or a system that accesses a service on the server 1404. The client(s) 1402 can be hardware and/or software (e.g., threads, processes, computing devices).). The client(s) 1402 can house threads to perform, for example, receiving an audio sample, generating a spectrogram, identifying peaks of a spectrogram, generating a set of triples, generating hashes, matching hashes, etc. in accordance with the subject disclosure. The client(s) 1402 can house cookie(s), metadata, and/or associated contextual information related to employing matching, for example.

The system 1400 also includes one or more server(s) 1404. The server(s) 1404 can also be hardware or hardware in combination with software (e.g., threads, processes, computing devices). The servers 1404 can house threads to perform, for example, receiving an audio sample, generating a spectrogram, identifying peaks of a spectrogram, generating a set of triples, generating hashes, matching hashes, etc. in accordance with the subject disclosure. One possible communication between a client 1402 and a server 1404 can be in the form of a data packet adapted to be transmitted between two or more computer processes where the data packet contains, for example, an audio sample or descriptors associated with an audio sample. The data packet can include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:

a processor; and a memory communicatively coupled to the processor, the memory having stored thereon computer executable components, comprising:

an input component configured to receive an audio sample;

a spectrogram component configured to generate a spectrogram of the audio sample and identify a set of interest points based on the spectrogram;

a triples component configured to:

generate at least one set of triples based on the set of interest points, wherein respective triples comprise elements associated with three interest points; and generate respective index histograms based on the at least one set of triples; and a hash component that generates one or more index hashes based on the respective index histograms.

2. The system of claim 1, further comprising:

a verification component configured to:

generate respective verification histograms for the triples comprising respective time and frequency components for interest points in the respective triples; and transforms the respective verification histograms into one or more verification hashes.

3. The system of claim 2, further comprising:

an index component configured to adds the one or more index hashes to a set of index hashes stored within an index data store and adds the one or more verification hashes to a set of verification hashes stored within a verification data store wherein the one or more index hashes and the one or more verification hashes are associated.

4. The system of claim 2, further comprising:

a matching component configured to compares the one or more index hashes to a set of index hashes associated with a plurality of reference audio content to determine a potential match.

5. The system of claim 4, wherein the matching component is further configured to use a hamming similarity in comparing the one or more index hashes to the set of index hashes to determine the potential match.

6. The system of claim 4, wherein the matching component is further configured to verify the potential match by comparing the one or more verification hashes to a set of verification hashes associated with the potential match.

7. The system of claim 1, wherein the respective interests are maxima within at least one of a local time or frequency window.

8. The system of claim 1, wherein the triples component is further configured to generate the at least one set of triples based on a maximum time span for each triple.

9. The system of claim 1, wherein the elements of each triple in the at least one set of triples contains a representation of a first frequency of a first interest point associated with the triple, a representation of a second frequency of a second interest point associated with the triple, a representation of a third frequency of a third interest point associated with the triple, a representation of a time of the third interest point, and a representation of a time span between the time of the first interest point and the time of the third interest point, wherein a time of the second interest is greater than the time of the first interest point and the time of the third interest point is greater than the time of the second interest point.

10. The system of claim 1, wherein the one or more index hashes are weighted minhashes.

11. The system of claim 2, wherein the one or more verification hashes are weighted minhashes.

12. The system of claim 1, wherein the elements of each triple in the at least one set of triples contains a first ratio of a first frequency of a first interest point associated with the triple to a second frequency of a second interest point associated with the triple, a second ratios of the second frequency to a third frequency of a third interest point associated with the triple, a representation of a time of the third interest point, and a representation of a time span between the time of the first interest point and the time of the third interest point, wherein a time of the second interest is greater than the time of the first interest point and the time of the third interest point is greater than the time of the second interest point.

13. A method, comprising:

generating, by a system including a processor, a spectrogram of an audio sample;

identifying, by the system, a plurality of interest points from the spectrogram;

generating, by the system, at least one set of triples based on the plurality of interest points, wherein respective triples comprise components associated with three interest points;

generating, by the system, respective index histograms based on the at least one set of triples; and transforming, by the system, the respective index histograms into one or more index hashes.

14. The method of claim 13, further comprising:

generating, by the system, respective verification histograms for the triples comprising respective time and frequency components for interest points in the respective triples; and transforming, by the system, the respective verification histograms into one or more verification hashes.

15. The method of claim 14, further comprising adding, by the system, the one or more index hashes to a set of index hashes stored within an index data store; and adding, by the system, the one or more verification hashes to a set of verification hashes stored within a verification data store wherein the one or more index hashes and the one or more verification hashes are associated.

16. The method of claim 14, further comprising:

determining, by the system, a potential matching reference audio content by comparing the one or more index hashes to a set of index hashes associated with a plurality of reference audio content; and verifying, by the system, the potential matching reference audio content by comparing the one or more verification hashes to a set of verification hashes associated with the potential matching reference audio content.

17. The method of claim 16, wherein comparing the one or more index hashes to the set of index hashes comprises using a hamming similarity.

18. The method of claim 13, wherein the respective interests are maxima within at least one of a local time or frequency window.

19. The method of claim 13, wherein the generating the at least one set of triples is further based on a maximum time span for each triple.

20. The method of claim 13, wherein the components of each triple in the at least one set of triples contains a representation of a first frequency of a first interest point associated with the triple, a representation of a second frequency of a second interest point associated with the triple, a representation of a third frequency of a third interest point associated with the triple, a representation of a time of the third interest point, and a representation of a time span between the time of the first interest point and the time of the third interest point, wherein a time of the second interest is greater than the time of the first interest point and the time of the third interest point is greater than the time of the second interest point.

21. The method of claim 13, wherein the one or more index hashes are weighted minhashes.

22. The method of claim 14, wherein the one or more verification hashes are weighted minhashes.

23. The method of claim 13, wherein the components of each triple in the at least one set of triples contains a first ratio of a first frequency of a first interest point associated with the triple to a second frequency of a second interest point associated with the triple, a second ratios of the second frequency to a third frequency of a third interest point associated with the triple, a representation of a time of the third interest point, and a representation of a time span between the time of the first interest point and the time of the third interest point, wherein a time of the second interest is greater than the time of the first interest point and the time of the third interest point is greater than the time of the second interest point.

24. A non-transitory computer-readable medium having instructions stored thereon that, in response to execution, cause a system including a processor to perform operations comprising:

selecting a plurality of interest points from the spectrogram;

generating at least one set of triples based on the plurality of interest points, wherein respective triples comprise components associated with three interest points; and generating respective index histograms based on the at least one set of triples; and generating one or more index hashes based on the respective index histograms.

25. The device of claim 24, the operations further comprising:

generating respective verification histograms for the triples comprising respective time and frequency components for interest points in the respective triples; and transforming the respective verification histograms into one or more verification hashes.

26. The device of claim 25, the operations further comprising:

determining a potential matching reference audio content by comparing the one or more index hashes to a set of index hashes associated with a plurality of reference audio content; and verifying the potential matching reference audio content by comparing the one or more verification hashes to a set of verification hashes associated with the potential matching reference audio content.

27. The device of claim 24, wherein the components of each triple in the at least one set of triples contains a representation of a first frequency of a first interest point associated with the triple, a representation of a second frequency of a second interest point associated with the triple, a representation of a third frequency of a third interest point associated with the triple, a representation of a time of the third interest point, and a representation of a time span between the time of the first interest point and the time of the third interest point, wherein a time of the second interest is greater than the time of the first interest point and the time of the third interest point is greater than the time of the second interest point.

28. The device of claim 24, wherein the components of each triple in the at least one set of triples contains a first ratio of a first frequency of a first interest point associated with the triple to a second frequency of a second interest point associated with the triple, a second ratios of the second frequency to a third frequency of a third interest point associated with the triple, a representation of a time of the third interest point, and a representation of a time span between the time of the first interest point and the time of the third interest point, wherein a time of the second interest is greater than the time of the first interest point and the time of the third interest point is greater than the time of the second interest point.

* * * * *